J. A. GODRYCZ.
ELECTROMAGNETIC ORGAN ACTION.
APPLICATION FILED FEB. 17, 1915.
1,233,220.
Patented July 10, 1917.
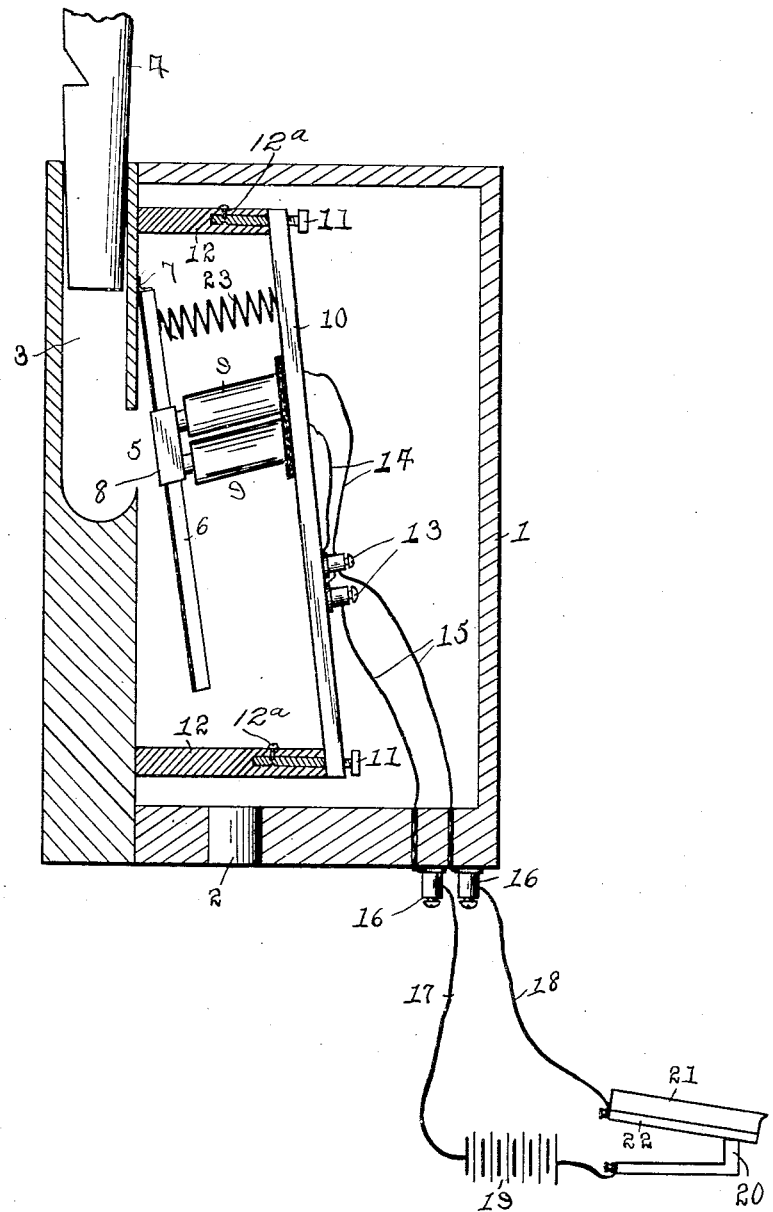
Witnesses
A. Tosh Jr.
H. Bowers.
Inventor
J. A. Godrycz
By S. Brashears
Attorney

UNITED STATES PATENT OFFICE.

JOHN A. GODRYCZ, OF PHILADELPHIA, PENNSYLVANIA.

ELECTROMAGNETIC ORGAN-ACTION.

1,233,220. Specification of Letters Patent. Patented July 10, 1917.

Application filed February 17, 1915. Serial No. 8,776.

*To all whom it may concern:*

Be it known that I, JOHN A. GODRYCZ, a citizen of the United States, residing at Philadelphia, in the county of Philadelphia and State of Pennsylvania, have invented certain new and useful Improvements in Electromagnetic Organ-Actions, of which the following is a specification.

This invention relates to pipe organs.

The object of the invention is, in a novel, practical and positive manner, electrically to secure the action of the pallets or valves that control the ports between the wind box and the air channels communicating with the pipes, whereby the action of the pallets will be rendered exceedingly sensitive to operation and responsive, under all conditions, to the manipulations of the keys, thus to insure the maximum of efficiency in the action of the valve units, with the minimum output of energy on the part of the operator, together with the absolute assurance of proper and mechanically perfect results.

With the above and other objects in view, as will appear as the nature of the invention is understood, the same consists in the novel arrangement and combination of the parts of an organ, as will be hereinafter fully described and claimed.

In the accompanying drawings, forming a part of the specification, the figure is a view in vertical transverse section of a portion of the wind box of a pipe organ, exhibiting the improvements of the present invention applied thereto.

Referring to the drawing, 1 designates, generally, the wind-box of a pipe-organ, provided with the usual air-inlet 2, and with the vertical channels 3, one only being shown designed to receive in their upper ends the pipes 4. Communication between each channel and the wind box is secured by a port 5, thus to permit escape of air from the wind box to the pipes in the ordinary manner. Each port is normally closed by a pallet or valve 6, suitably felted to secure an air tight closure between it and the rear face of the front wall of the wind box, and also to prevent noise when the valve seats. The valve is secured, preferably by a flexible hinge 7 to the rear face of the front wall of the wind box, and may be constructed of wood or of any other material suited to the purpose, and has secured to it, opposite the port 5, an armature 8, the object of this arrangement being to permit the armature to enter the port when the valve closes and thus permit true seating of the latter, thereby precluding any possibility of passage of wind to the pipe. If preferred, the valve may be wholly of soft iron, suitably felted, to provide an armature.

The armature is actuated by an electromagnet 9 that is secured to a board 10 held rigidly within the wind box, in a substantially vertical position, by a pair of adjusting screws 11 carried by a pair of horizontally disposed brackets 12 projecting rearwardly from the front wall of the wind box. The screws 11 are threaded through the board and turn freely in the brackets, being circumferentially grooved to receive the inner ends of screws 12ª. By turning the screws 11, the board 10 and the electro-magnet may be moved toward or from the armature thereby to regulate the throw of the latter and thus vary the opening of the port. Secured to the board are two binding posts 13 to which are connected the wires 14 from the electro-magnet and two other wires 15 suitably connected with binding posts 16 carried by the under wall of the wind box. To these latter binding posts are connected two wires 17 and 18, the former wire connecting through a battery 19 with a contact 20 disposed beneath the organ key 21; and the latter wire with a contact 22 secured to the under side of the key. The arrangement described is common to each of the pipes and keys of an organ, so that a description of one will serve for all.

In operation, upon a key being depressed, the circuit will be completed through the battery, thereby energizing the electro-magnet and causing the latter to attract the armature and thus open the valve controlling the pipe corresponding to the operated key. As soon as the key is released, the electromagnet is deënergized, and in order to return the valve to closed position, a coiled spring 23 is employed, which may either be disposed between the upper end of the valve and the board 10, or between the lower end of the valve and the rear face of the front wall of the wind box. This spring in either event will secure the instantaneous closing of the valve and thus preclude the passage of air to the pipe.

The improvements herein described while simple in character will be found thoroughly efficient for the purpose designed, and form a highly efficient and durable form of valve controlling mechanism for pipe organs.

While I have specifically described the construction, operation and location of the various parts comprised in my invention, it will be obvious to those skilled in the art to which the invention most nearly appertains, that slight changes and variations may be made in the construction, operation and location of the parts, within the scope of the appended claim, without departing from the spirit of the invention.

Having thus fully described my invention, what I claim as new and desire to secure by United States Letters Patent, is—

In an organ, a wind-box having its front wall provided with a vertical channel open at the top to receive an organ pipe, a port opening into the wind-box through the rear wall of the channel, a valve pivoted to said rear wall and arranged to open or close said port by direct contact with said rear wall, an armature carried by the valve, a pair of brackets projecting into the wind-box, a board adjustably secured on the inner ends of said brackets and an electro-magnet carried by the board and arranged to attract the armature.

In testimony whereof I affix my signature in presence of two witnesses.

JOHN A. GODRYCZ.

Witnesses:
WILLIAM D. LELAN,
ROBT. BRIGGS.